United States Patent
Smothermon et al.

(10) Patent No.: US 12,066,534 B2
(45) Date of Patent: Aug. 20, 2024

(54) SYSTEM AND METHOD FOR PRECISION SPIN MEASUREMENT USING AUTOCORRELATION

(71) Applicant: Applied Concepts, Inc., Richardson, TX (US)

(72) Inventors: Jared Smothermon, Lucas, TX (US); James K. McCoy, Garland, TX (US); Robert S. Gammenthaler, Princeton, TX (US)

(73) Assignee: APPLIED CONCEPTS, INC., Richardson, TX (US)

( * ) Notice: Subject to any disclaimer, the term of this patent is extended or adjusted under 35 U.S.C. 154(b) by 0 days.

(21) Appl. No.: 17/824,467

(22) Filed: May 25, 2022

(65) Prior Publication Data

US 2022/0283302 A1    Sep. 8, 2022

Related U.S. Application Data (63) Continuation of application No. 16/662,612, filed on Oct. 24, 2019, now Pat. No. 11,346,945, which is a
(Continued)

(51) Int. Cl.
*G01S 17/04* (2020.01)
*G01S 7/35* (2006.01)
(Continued)

(52) U.S. Cl.
CPC ............. *G01S 17/04* (2020.01); *G01S 7/41* (2013.01); *G01S 17/88* (2013.01); *G01S 7/354* (2013.01);
(Continued)

(58) Field of Classification Search
CPC . G01S 7/415; G01S 7/41; G01S 7/354; G01S 7/356; G01S 13/88; G01S 13/58; G01S 17/88; G01S 17/58
(Continued)

(56) References Cited

U.S. PATENT DOCUMENTS 3,320,615 A * 5/1967 Albright ................ G01S 13/46
342/453
3,878,525 A * 4/1975 Alpers ................ G01S 13/343
342/16
(Continued)

FOREIGN PATENT DOCUMENTS

CN             106569195 A  *  4/2017  ............... G01S 7/41

OTHER PUBLICATIONS

"Rotation Periods of 34,030 Kepler Main-Sequence Stars: The Full Autocorrelation Sample" by A. McQuillan (Year: 2014).*
(Continued)

*Primary Examiner* — Vladimir Magloire
*Assistant Examiner* — Michael W Justice
(74) *Attorney, Agent, or Firm* — Jackson Walker LLP; Christopher J. Rourk (57) ABSTRACT

A method for determining spin of a projectile comprising generating an electromagnetic radar signal and transmitting the electromagnetic radar signal towards a projectile. Receiving a reflected electromagnetic radar signal from the projectile. Identifying a component of the reflected electromagnetic radar signal, and performing an autocorrelation process on the reflected electromagnetic radar signal using the component to generate an estimate of a spin of the projectile as a function of the autocorrelation process.

20 Claims, 3 Drawing Sheets

Related U.S. Application Data continuation of application No. 16/511,106, filed on Jul. 15, 2019, now Pat. No. 10,935,657.

(60) Provisional application No. 62/844,378, filed on May 7, 2019.

(51) Int. Cl.
  *G01S 7/40* (2006.01)
  *G01S 7/41* (2006.01)
  *G01S 17/88* (2006.01)

(52) U.S. Cl.
  CPC ............ *G01S 7/356* (2021.05); *G01S 7/4008* (2013.01); *G01S 7/4021* (2013.01); *G01S 7/415* (2013.01)

(58) Field of Classification Search
  USPC ................................. 342/192, 196, 193, 104
  See application file for complete search history.

(56) References Cited

U.S. PATENT DOCUMENTS

| | | | | |
|---|---|---|---|---|
| 4,041,293 A * | 8/1977 | Kihlberg | ............... | G01S 13/605 702/143 |
| 4,426,647 A * | 1/1984 | Tomasi | ................ | G01S 13/605 342/112 |
| 4,686,532 A * | 8/1987 | McAulay | .............. | G01S 13/522 367/87 |
| 5,081,459 A * | 1/1992 | Guillerot | ............ | G01S 13/5246 342/90 |
| 5,401,026 A * | 3/1995 | Eccher | ............... | A63B 24/0021 473/199 |
| 5,689,268 A * | 11/1997 | Shi | .......................... | G01S 7/415 342/192 |
| 6,031,485 A * | 2/2000 | Cellai | ................... | G01S 13/003 342/131 |
| 6,067,040 A * | 5/2000 | Puglia | ................... | G01S 13/582 342/134 |
| 6,244,971 B1 * | 6/2001 | Mihran | .............. | A63B 24/0021 473/378 |
| 6,454,714 B1 * | 9/2002 | Ng | ...................... | G01S 7/52039 600/443 |
| 6,847,676 B1 * | 1/2005 | Ng | ......................... | H04B 1/709 342/357.395 |
| 7,881,004 B2 * | 2/2011 | Kumbla | ................. | G11B 20/14 360/77.02 |
| 7,916,799 B2 * | 3/2011 | Brink | ................... | H04B 1/7183 375/260 |
| 9,041,594 B2 * | 5/2015 | Peczalski | ................ | G01S 13/42 342/104 |
| 9,592,427 B2 * | 3/2017 | Kitazaki | ............ | A63B 37/0039 |
| 9,630,318 B2 * | 4/2017 | Ibarz Gabardos | ..... | B25J 9/1607 |
| 9,645,251 B1 * | 5/2017 | Gibbons | ................ | G01S 19/18 |
| 9,983,315 B1 * | 5/2018 | Alexander | ............. | G01S 19/53 |
| 10,107,901 B2 * | 10/2018 | Guenther | ............ | G01S 15/8925 |
| 10,379,213 B2 * | 8/2019 | Saegusa | ................ | G01S 13/583 |
| 10,416,300 B2 * | 9/2019 | Beauchamp | ........ | G01S 13/5244 |
| 10,795,017 B2 * | 10/2020 | Kawai | ...................... | G01S 7/025 |
| 11,402,469 B2 * | 8/2022 | Harman | ................ | G01S 13/878 |
| 2005/0030222 A1 * | 2/2005 | Steudel | ................... | G01S 13/66 342/107 |
| 2007/0268976 A1 * | 11/2007 | Brink | ................... | H04B 1/7183 375/344 |
| 2010/0067134 A1 * | 3/2010 | Kumbla | ................ | G11B 20/14 |
| 2011/0285578 A1 * | 11/2011 | Peczalski | ................ | G01S 13/58 342/107 |
| 2016/0096270 A1 * | 4/2016 | Ibarz Gabardos | ..... | G06N 3/049 901/3 |
| 2016/0195613 A1 * | 7/2016 | Knox | ...................... | B61L 3/065 342/52 |
| 2016/0327642 A1 * | 11/2016 | Saegusa | ................ | G01S 13/88 |
| 2016/0356884 A1 * | 12/2016 | Guenther | ............ | G01S 15/8925 |
| 2017/0291301 A1 * | 10/2017 | Ibarz Gabardos | ..... | B25J 9/0081 |
| 2018/0106889 A1 * | 4/2018 | Schuck | ................ | G01S 13/886 |
| 2018/0136326 A1 * | 5/2018 | Schuck | ................ | G01S 13/583 |
| 2018/0292530 A1 * | 10/2018 | Kawai | ...................... | G01S 7/42 |
| 2019/0094351 A1 * | 3/2019 | Beauchamp | ........... | G01S 7/415 |
| 2019/0219683 A1 * | 7/2019 | Fang | ...................... | G01S 13/93 |
| 2019/0339358 A1 * | 11/2019 | Rimini | ................. | G01S 7/0232 |

OTHER PUBLICATIONS

"Measuring the rotation period distribution of field M dwarfs with Kepler" by A. McQuillan (Year: 2013).*

* cited by examiner

SYSTEM AND METHOD FOR PRECISION SPIN MEASUREMENT USING AUTOCORRELATION

RELATED APPLICATIONS

This non-provisional application is a continuation of U.S. patent application Ser. No. 16/662,612 filed Oct. 24, 2019, which is a continuation of U.S. patent application Ser. No. 16/511,106 filed Jul. 15, 2019, now issued as U.S. Pat. No. 10,935,657 on Mar. 2, 2021, which claims benefit of and priority to U.S. Provisional Application No. 62/844,378 filed May 7, 2019, which are hereby incorporated by reference for all purposes, as if presented herein in their entireties.

TECHNICAL FIELD

The present disclosure relates generally to spin measurement of baseballs, tennis balls and other projectiles, and more specifically to a system and method for precision spin measurement using radar.

BACKGROUND OF THE INVENTION

Existing systems and methods for spin detection of projectiles use photographic data to determine spin. These systems are expensive, provide error-prone results and are difficult to use.

SUMMARY OF THE INVENTION

A method for determining spin of a projectile is described that includes generating an electromagnetic radar signal and transmitting the electromagnetic radar signal towards a projectile. A reflected electromagnetic radar signal is received from the projectile, and a component of the reflected electromagnetic radar signal is identified. An autocorrelation process is performed on the reflected electromagnetic radar signal using the component to generate an estimate of a spin of the projectile as a function of the autocorrelation process.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which.

DETAILED DESCRIPTION OF THE INVENTION

In the description that follows, like parts are marked throughout the specification and drawings with the same reference numerals. The drawing figures may be to scale and certain components can be shown in generalized or schematic form and identified by commercial designations in the interest of clarity and conciseness.

It is known that spin can modify the flight of projectiles, such as baseballs and tennis balls. Previously, high speed cameras were used to measure projectile spin, but such high speed cameras are expensive and difficult to operate, making them unable to provide prompt feedback to sports participants. Such athletes can improve their performance by understanding the dynamics of spin variation versus flight path, and if projectile spin data is readily available, it allows them to apply this knowledge to their sport activities. As such, the ability to quickly determine projectile spin data can help to improve the performance of athletes.

The present disclosure provides systems and methods to measure the rate of rotation of a projectile, which can be expressed herein as measured in rotations per minute (RPM) or in other suitable manners. Two different example methods are described, as well as a method for combining both of these example systems and methods, and specific algorithmic details for an example implementation. Use of a continuous wave RADAR system is assumed in this description, but burst mode RADAR, LIDAR or other suitable data generation systems can also or alternatively be used.

Electromagnetic radiation is known to interact with stationary objects, moving objects, spinning objects and other suitable objects. An autocorrelation based method of measuring the spin of an object is described, based on the following assumptions. First, it is assumed that the received signal is reflected from an object that is seen by the radar. At each moment as the object spins, the radar "sees" a "different" object. Once the object has made a complete rotation, the object "looks" to the radar as it did one complete rotation prior. With this perspective, and assuming the received signal that represents what the radar is "seeing" at any given time is described as x(t), then x(t) is a periodic signal with a period corresponding to the time it takes to make a complete rotation of the object.

If the received signal is defined as:

$$x(t) \qquad (1)$$

Then, assuming the simplified condition that the object is spinning about an axis of rotation that is fixed with respect to the radar device and assuming the distance from the object to the radar is also fixed, then the received signal is periodic:

$$x(t)=x(t-\tau) \qquad (2)$$

where τ represents the amount of time it takes for the object to make a complete rotation. Given the above relationship, any suitable process can be used to discover τ. The present disclosure uses a variation of the autocorrelation function to discover the value of τ in one example embodiment.

The autocorrelation function can be defined in various ways. One way is as follows:

$$r(\tau) = \Sigma x(n) x(n-\tau) \quad (3)$$

where the summation is made over n, and where n is a number of measurements that are made. This function r(τ) is computed for different values of τ and then the value of τ for which r(τ) is maximum corresponds to the value of τ that is proportional to the spin rate of the object.

When the axis of rotation is changing with respect to the radar signal receiver, as long as the axis of rotation is changing slowly compared to spin rate of the object, the assumption above still approximately holds. Similarly if the object is changing position with respect to the radar signal receiver, the assumption still approximately holds. In other words, finding τ by using some variant of an autocorrelation still finds the correct estimate for the spin rate of the object because the salient feature of the received signal is the periodic nature of the signal, even though each period is slightly different from the others due to noise, changes in position, changes in axis of rotation, and other changes.

The shoulder width method of measuring spin rate relies on the Doppler shift seen by the radar when the illuminated object is moving with respect to the radar. For an object moving towards or away from the radar, a Doppler shift is seen in the received signal by the radar and is proportional to the velocity of the object with respect to the radar.

To measure the spin of an object, the Doppler shift can be analyzed in a bit more detail. Specifically, the object can be modelled as being composed of many tiny objects that are fused together. Because the radar does not penetrate deep into the object, it is possible to only consider the surface area of the object. Therefore, the "tiny objects" become tiny patches of the surface of the object. In the calculus sense, as the area of the tiny patches goes to zero, the number of patches composing the surface of the object goes to infinity. So, the surface of the object is modelled as being composed of many tiny patches, all of which contribute a Doppler shift component to the signal received by the radar. The majority of the signal power of the Doppler signal received by the radar is concentrated at the shift corresponding to the speed of the center of the object moving with respect to the radar. However, all the patches of the surface that are moving faster or slower than the centroid also contribute to the Doppler signal components. As such, the fastest patch is associated with the surface location that has the greatest radius (i.e. that is furthest from the axis of rotation) and that is moving faster than the center of mass of the object. Similarly, the slowest patch is associated with the surface location that has the greatest radius (i.e. is furthest from the axis of rotation) and that is moving slower than the center of mass of the object.

Figure 1:
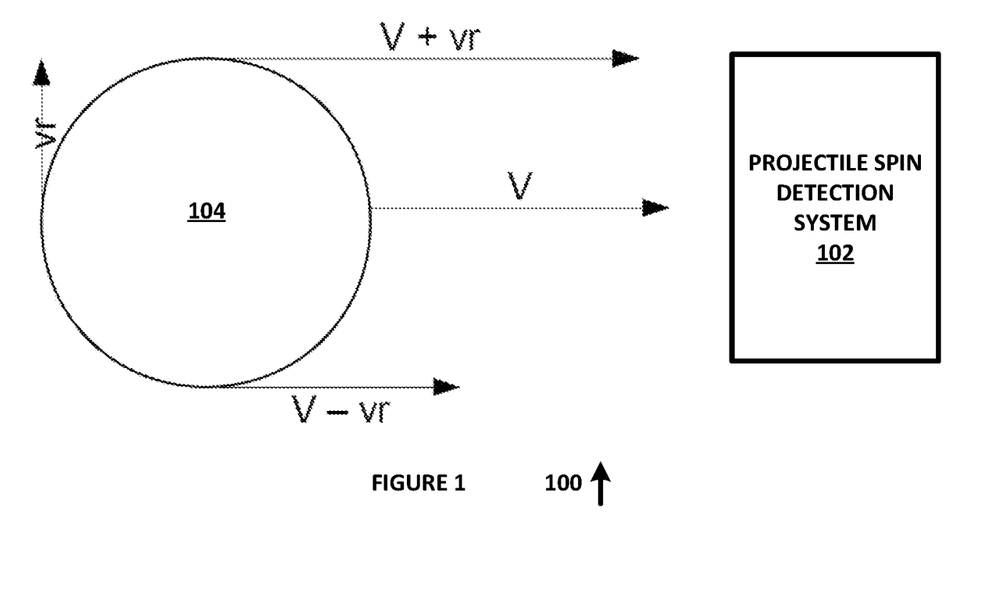
FIG. 1 is a diagram of a system for determining spin of a projectile, in accordance with an example embodiment of the present disclosure.

FIG. 1 is a diagram of a system 100 for determining spin of a projectile, in accordance with an example embodiment of the present disclosure. System 100 includes projectile spin detection system 102 and projectile 104.

Assume that projectile 104 can be modelled as a spherical object having uniform mass density, an axis of rotation through the center of mass of the projectile 104 and other simplified attributes for the purpose of this analysis. Under these assumptions, the edge of projectile 104 travels at a speed of vr with respect to the center of projectile 104, so if projectile 104 is travelling directly towards projectile spin detection system 102, then the fastest moving patch seen by projectile spin detection system 102 is travelling at a speed of V+vr, while the slowest patch seen by projectile spin detection system 102 is travelling at a speed of V−vr. In this embodiment, projectile spin detection system 102 will also see patches travelling at all speeds within these two extremes, with the majority concentrated at V.

Figure 2:
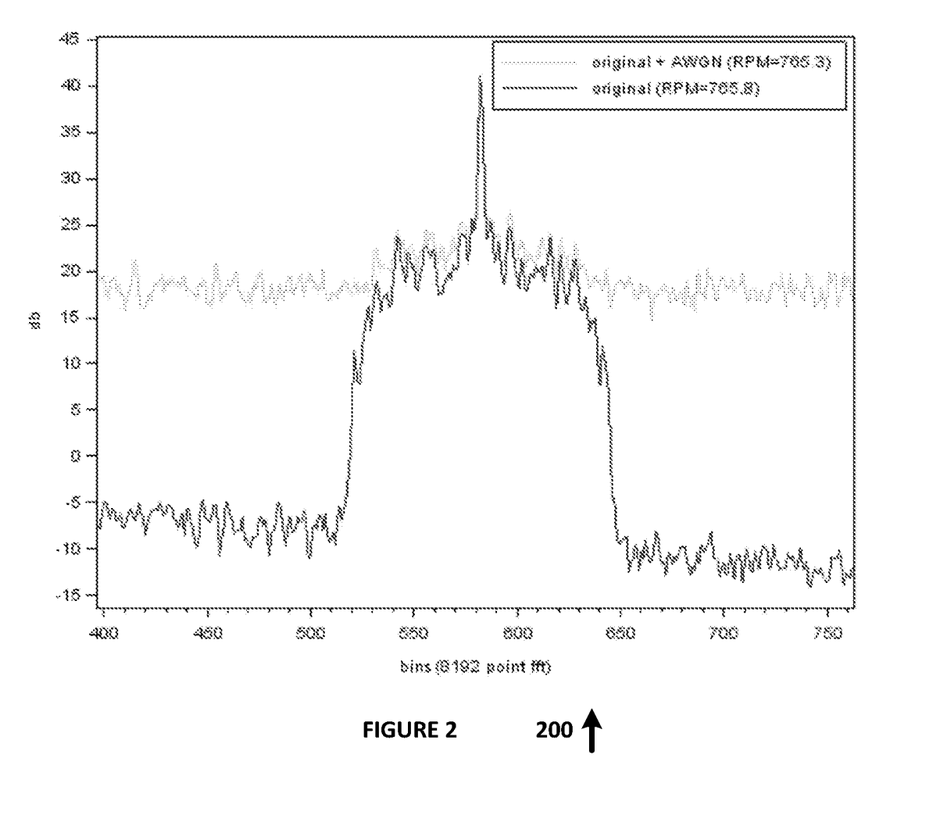
FIG. 2 is a diagram of a radar signal spectrum that is generated for a spinning projectile as seen by a projectile spin detection system, in accordance with an example embodiment of the present disclosure.

FIG. 2 is a diagram of a radar signal spectrum that is generated for a spinning projectile 104 as seen by projectile spin detection system 102, in accordance with an example embodiment of the present disclosure. The strongest signal is centered at the speed of projectile 104 as seen by projectile spin detection system 102, and the patches of projectile 104 that are travelling both faster and slower than this peak are clearly visible. If the frequency band from the left and right edges (or similarly from either edge to the center) is measured, it is found that the measured frequency band is proportional to the rate of spin of projectile 104. The constant of proportionality depends on the circumference of projectile 104, the Fast Fourier Transform (FFT) length, microwave frequency, and other variables used by projectile spin detection system 102. While an FFT is shown in this example, a discrete Fourier transform (DFT), Spectral Analysis (SA) or other suitable signal processing can be also or alternatively used, and all of these signal processing techniques are generally referred to as FFT herein for brevity.

In accordance with this example embodiment, a particular implementation of the above methods of measuring spin rates of objects is provided. This particular implementation is just one of many valid ways of implementing the above. For an example implementation for Ka Band radar, assume that two radar antennae receive channels in quadrature, and that there is a 192 KHz sample rate (other suitable numbers of channels and sample rates can also or alternatively be used). For an autocorrelation method, digital filtering of the time series data can be used to reduce noise components, and an autocorrelation function can then be performed on the data at many different lags to find the lag corresponding to the largest autocorrelation value. Example pseudocode for performing this analysis is provided as follows.

Assume an array D of N complex data samples (samples are in quadrature) is available from a radar receiver, and that the sense of the signal in D is such that the direction of travel of the object results in the object being seen as a positive frequency signal (this convention is used for simplicity in the following explanation, since it is arbitrary for the purposes of this analysis which channel is deemed real and which is deemed imaginary). The following variables are used:

```
d = LowPassFilter(D); // remove high frequency components outside
range of interest
d = Decimate(d); // helps to reduce the number of calculations
performed in subsequent steps
d = HighPassFilter(d); // remove low frequency components outside
range of interest
d = RemoveNegativeFrequencies(d); //use two Hilbert transform
pairs to accomplish this
m = ComplexMagnitude(d); // m(i) = sqrt(real(d(i))^2 +
imaginary(d(i))^2)
// compute autocorrelation of data efficiently using ifft(fft(x)
* conj(fft(x))
```

```
y = ifft(fft(x) * conj(fft(x))); // example way to do this
// and then highlight/normalize the peaks in the autocorrelation
y = y - lowpass(y) // normalize and accentuate peaks
peakLocation = location of maximum(y) // Spin is inversely
proportional to peakLocation
```

For one example embodiment of the shoulder width determination, an FFT of radar data can be used to find the signal of a rotating object and measure the shoulder width. Averaging of the signals can be used to reduce noise and increase the signal to noise ratio (SNR), which can be accomplished by coherent averaging of multiple frames of FFTs or in other suitable manners. Specifically, for each FFT, the center of the signal can be aligned with the center of the average signal and then added to the average.

Assuming that the input to this algorithm is a series of FFTs with 2048 frequency data magnitude points, at a high level, the FFT data needs to be averaged, but averaging has to be performed in a coherent manner. Averaging can be performed by aligning all of the FFTs such that the FFT bin with the maximum energy corresponding to the speed of the center of the object is the same for all FFTs. Once this process is done, the frames of data can be averaged. Example pseudocode for performing this analysis is provided as follows.

Assume there are N frames of time series data representing the flight of the spinning projectile. Each frame is converted to the frequency domain via FFT. These N frames of FFT data can be denoted as F[n], where n is in the set $\{1, \ldots, N\}$:

```
peakBinLocation = FindPeakLocation(F[1]); //bin corresponding to
the speed of the projectile (not spin)
sumFFT = vector of all zeros
for i = 1 to N
  {
    peakLocation = FindPeakLocation(F[i]);
    sumFFT = sumFFT + ShiftBins(F[i], peakBinLocation-
peakLocation); // line up all FFTs so they are added coherently
  }
filtFFT = LowPassFilterToRemoveNoise(sumFFT);
binCount = 1;
while filtFFT[peakBinLocation+binCount] > (avgValueNoiseFloor +
5dB)
  {
    binCount = binCount + 1
  }
SpinRate = binCount * K; where K is dependent on circumference of
a spherical projectile, microwave frequency, FFT bin width, and
other variables.
```

Figure 3:
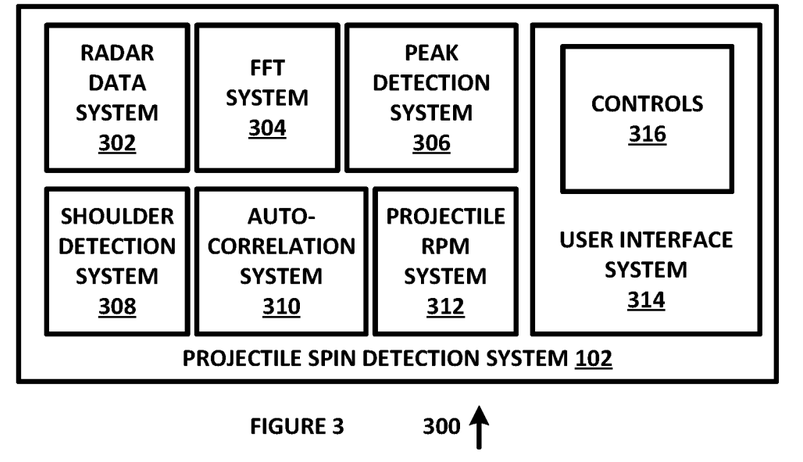
FIG. 3 is a diagram of a system for precision spin measurement using radar, in accordance with an example embodiment of the present disclosure.

FIG. 3 is a diagram of a system 300 for precision spin measurement using radar, in accordance with an example embodiment of the present disclosure. System 300 includes projectile spin detection system 102, radar data system 302, FFT system 304, peak detection system 306, shoulder detection system 308, autocorrelation system 310, projectile revolutions per minute (RPM) system 312 and user interface system 314 with controls 316, each of which can be implemented in hardware or a suitable combination of hardware and software.

Projectile spin detection system 102 generates radar data of a projectile and determines the spin of the projectile by processing the radar data. In general, radar data is generated by illuminating an object with radio frequency electromagnetic radiation, and by processing the reflected electromagnetic radiation that is received and converted to electrical signals. This process can be performed by special purpose devices that have hardware and associated software that generates the signal, transmits it towards an object and then collect a time domain signal of the reflected electromagnetic radiation over a sampling period. The special purpose devices can include controls to allow a user to locate a specific object and to place that object at or near the center of the transmitted radio frequency electromagnetic signal. The special purpose devices can then convert the measured time domain signal to a frequency domain, such as by performing an FFT on the time domain signal. The FFT generates frequency domain components of the time domain signal, and these frequency domain signals can be analyzed in accordance with the disclosed systems and methods to determine the spin of a projectile, either alone or in combination with time domain signals (such as for an autocorrelation method).

Radar data system 302 can include one or more oscillators or other suitable devices that generate radio frequency electromagnetic radiation, an antenna structure that transmits the radio frequency electromagnetic radiation towards a selected target, an antenna structure that receives reflected radio frequency electromagnetic radiation from the target and other objects, processing circuits that process the received signal and other suitable systems and components. Radar data system 302 can operate under algorithmic control of projectile spin detection system 102, and can transmit processed radar data to FFT system 304, peak detection system 306, shoulder detection system 308, autocorrelation system 310, projectile RPM system 312 or other suitable systems.

FFT system 304 receives a time domain radar signal from radar data system 302 or other suitable sources, and converts it to a frequency domain signal, such as by using an analog or digital Fast Fourier Transform. FFT system 304 can operate under algorithmic control of projectile spin detection system 102, and can transmit FFT data to peak detection system 306, shoulder detection system 308, projectile RPM system 312 or other suitable systems.

Peak detection system 306 receives FFT data and other suitable data, and identifies one or more peaks in the FFT data. In one example embodiment, the FFT data can include noise or other signal components that are not correlated to the reflected signal, and peak detection system 306 can exclude such signal components from the identified peaks, such as by analog pre-filtering or digital filtering, by trend analysis or by other suitable signal processing techniques. Peak detection system 306 can operate under algorithmic control of projectile spin detection system 102, and can transmit peak detection data to shoulder detection system 308, projectile RPM system 312 or other suitable systems.

Shoulder detection system 308 identifies one or more shoulders in the FFT data, such as by determining a point at which FFT energy associated with a peak has fallen to a predetermined level relative to that peak, by determining a matched set of positive and negative deviations from the peak that have a predetermined energy or in other suitable manners. In one example embodiment, the shoulder detection system can receive calibration data that specifies a known shoulder width associated with a known RPM of a projectile and can use that calibration data to determine the predetermined level, predetermined energy or other suitable data. Shoulder detection system 308 can operate under algorithmic control of projectile spin detection system 102, and can transmit shoulder detection data to projectile RPM system 312 or other suitable systems.

Autocorrelation system 310 receives radar data over successive time domain measurement windows and correlates data in each time window to identify data associated with a projectile. In one example embodiment, the radar data can be processed and filtered to allow a lag of a peak associated with a projectile to be determined, and the RPM data can be determined from the lag data. Autocorrelation system 310 can operate under algorithmic control of projectile spin detection system 102, and can transmit autocorrelation data to projectile RPM system 312 or other suitable systems.

Projectile RPM system 312 receives data from one or more of shoulder detection system 308, autocorrelation system 310 or other suitable systems and generates an RPM estimate of the projectile. Projectile system 312 can operate under algorithmic control of projectile spin detection system 102, and can generate a user display that includes the projectile RPM, a projectile speed, a projectile direction and other suitable data.

User interface system 314 with controls 316 can be generated on a touch screen interface, using a keyboard and display, or using other suitable user interfaces devices and controls. In one example embodiment, user interface system 314 generates a display of projectile RPM data, such as a video image with an overlay that shows an RPM for a projectile contained in the video image, a static display with predetermined fields or other suitable user interfaces and controls. A user can be prompted to select a mode of operation, such as to use a shoulder width detection process, an autocorrelation process, a combination of processes or other suitable processes by which to determine an estimated spin of a projectile. The accuracy of the spin detection process can be adjusted, so as to exclude inaccurate estimates, and other suitable data can also or alternatively be provided.

In operation, system 300 generates projectile spin data using radar signals to determine a rotational speed of a projectile. System 300 can be implemented in conjunction with a hand-held radar device, such as to allow a user to generate real-time spin data for baseballs, footballs, or other sporting equipment, so as to provide immediate feedback to an athlete for improvement of athletic skills.

Figure 4:
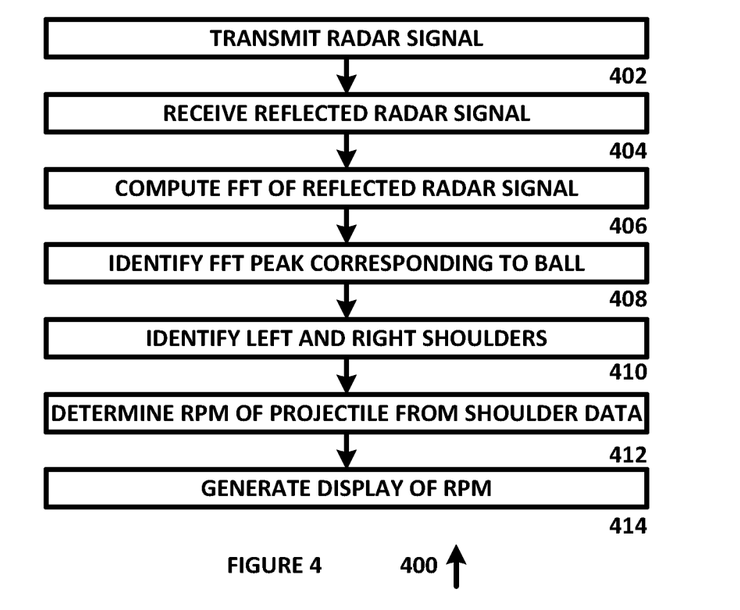
FIG. 4 is a diagram of an algorithm for precision spin measurement using radar and shoulder width determination, in accordance with an example embodiment of the present disclosure.

FIG. 4 is a diagram of an algorithm 400 for precision spin measurement using Doppler radar and shoulder width determination, in accordance with an example embodiment of the present disclosure. Algorithm 400 can be implemented in hardware or a suitable combination of hardware and software.

Algorithm 400 begins at 402, where a radar signal is transmitted. In one example embodiment, a processor can be used to control a system for generating, transmitting, receiving and processing radar signals, such as in a self-contained handheld device or in other suitable embodiments. The radar signal can be generated by causing a radar transmitter to generate a radio frequency signal having a predetermined waveform, predetermined analog or digital encoded data, a predetermined frequency and other suitable parameters, and to be transmitted from a suitable antenna structure towards an object. The algorithm proceeds to 404.

At 404, a reflected radar signal is received. In one example embodiment, the reflected radar signal can be received at the same antenna structure that was used to transmit the radar signal, at a separate and distinct antenna structure, or in other suitable manners. The reflected radar signal can be processed to identify the analog or digital encoded data, such as to determine a time associated with the transmission and reflection of the radar data, or other suitable processing can also or alternatively be used. The algorithm then proceeds to 406.

At 406, an FFT of reflected time domain electromagnetic signal data or other suitable time domain data is computed. The calculation can be performed by a hardware system for processing radar data, by a combined hardware and software system for processing radar data or in other suitable manners. In one example embodiment, each frame of radar data can be identified and can be associated with a transmission time, both to determine a distance between a transmitter and the object that reflected the signal and to distinguish one time frame of data from a previous or subsequent time frame of data. The algorithm then proceeds to 408.

At 408, the algorithm finds the peak corresponding to the pitch speed of the ball. In one example embodiment, the pitch speed can be determined from a calibration setting, such as when a pitching machine with a known value of RPM is being used to perform calibration. In another example embodiment, the pitch speed of the ball can be determined by evaluating the FFT signals to identify signals of objects having a heading and speed that fall within a predetermined expected range. The algorithm then proceeds to 410.

At 410, the algorithm identifies one or more of the "shoulders" at the left and right of the peak. In one example embodiment, one or more of the shoulders can be determined by analyzing the magnitude of the FFT frequency components on either side of the peak, to determine a point at which the FFT frequency components begin to fall off below a predetermined value, at a predetermined rate or in other suitable manners. In another example embodiment, a change in a slope of a series of frequency components of the frequency domain signal can be determined, and a predetermined metric can be used to determine whether the absolute value of the slope is less than a predetermined value. Likewise, other suitable algorithmic processes can also or alternatively be used, such as pattern matching to determine a location at which a change in slope from a greater negative value to a lesser negative value on a lower frequency range of the frequency data corresponds to a change in slope from a lesser positive value to a greater positive value on a higher frequency range of the frequency data, as the frequency value of the frequency components increases, or other suitable data. The algorithm then proceeds to 412.

At 412, the width of one or more of the shoulders is determined, and the RPM of the ball is determined by comparing the width of the shoulders to predetermined calibration data that identifies known RPM data to previously determined shoulder widths, or in other suitable manners. In one example embodiment, each frame of radar data can be identified and can be associated with a transmission time, both to determine a distance between a transmitter and the object that reflected the signal and to distinguish one time frame of data from a previous or subsequent time frame of data. The algorithm then proceeds to 414 where a user display is generated.

Although algorithm 400 is shown as a flow chart, other suitable conventions for representing or implementing algorithm 400 can also or alternatively be used, including but not limited to object oriented programming, state diagrams, ladder diagrams and a massively parallel method suitable for implementation in an FPGA or other hardware-based approach.

Figure 5:
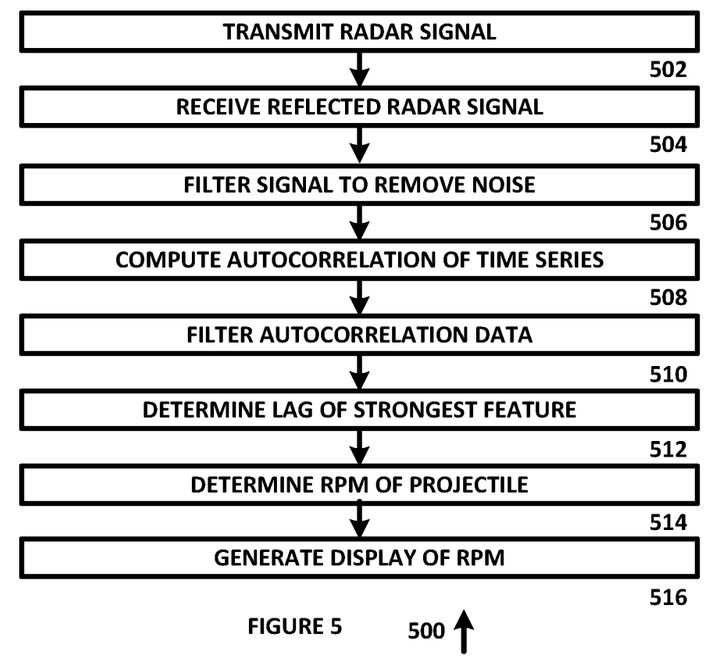
FIG. 5 is a diagram of an algorithm for precision spin measurement using radar and autocorrelation, in accordance with an example embodiment of the present disclosure.

FIG. 5 is a diagram of an algorithm 500 for precision spin measurement using Doppler radar and autocorrelation, in accordance with an example embodiment of the present disclosure. Algorithm 500 can be implemented in hardware or a suitable combination of hardware and software.

Algorithm 500 begins at 502, where a radar signal is transmitted. In one example embodiment, a processor can be used to control a system for generating, transmitting, receiving and processing radar signals, such as in a self-contained handheld device or in other suitable embodiments. The radar signal can be generated by causing a radar transmitter to generate a radio frequency signal having a predetermined waveform, predetermined analog or digital encoded data, a predetermined frequency and other suitable parameters, and to be transmitted from a suitable antenna structure towards an object. The algorithm proceeds to 504.

At 504, a reflected radar signal is received. In one example embodiment, the reflected radar signal can be received at the same antenna structure that was used to transmit the radar signal, at a separate and distinct antenna structure, or in other suitable manners. The reflected radar signal can be processed to identify the analog or digital encoded data, such as to determine a time associated with the transmission and reflection of the radar data, or other suitable processing can also or alternatively be used. The algorithm then proceeds to 506.

At 506, the radar data is filtered to remove low and high frequencies that are outside the band of interest. In one example embodiment, if a directional signal is available, all information corresponding to the wrong direction of travel can be removed, such as by using a complex bandpass filter, a Hilbert transform pair or in other suitable manners. Likewise, other suitable processes such as decimation can also or alternatively be used. The algorithm then proceeds to 508.

At 508, the autocorrelation of the time series data is computed. In one example embodiment, the signal is correlated with a delayed copy of itself as a function of delay. The algorithm then proceeds to 510.

At 510, the autocorrelation results are filtered. In one example embodiment, filtering can be used to reduce noise, eliminate false readings and for other suitable purposes. The algorithm then proceeds to 512.

At 512, the lag of the strongest feature is determined, which is inversely proportional to the RPM. In one example embodiment, the lag of the strongest feature is used to determine how fast the projectile is rotating, as a function of the change in radial distance between the strongest identified feature. In this example embodiment, a feature on the projectile that results in the strongest peak will rotate across the face of the projectile that is towards the system that is transmitting the radar data, and may increase slightly in magnitude as it traverses from the first edge of the projectile at which it appears towards the middle. Likewise, as the projectile continues to spin, the peak may decrease in magnitude as the feature traverses from the middle to the second edge, and then the peak will disappear altogether as the feature traverses the rear face of the projectile, away from the monitoring system. The measured lag of the strongest feature as a function of time can thus be used to determine the radial or rotational speed of the projectile. The algorithm then proceeds to 514.

At 514, the RPM of the projectile is determined. In one example embodiment, the RPM can be determined as discussed herein or in other suitable manners. The algorithm then proceeds to 516.

At 516, a display of the RPM is generated. In one example embodiment, the display can include a number of controls that allow the user to switch between different modes of operation, such as a shoulder width mode, an autocorrelation mode, a mixed mode, a high confidence mode and other suitable modes, where the user control selection causes a mode of operation of a spin measurement system to change.

Although algorithm 500 is shown as a flow chart, other suitable conventions for representing or implementing algorithm 500 can also or alternatively be used, including but not limited to object oriented programming, state diagrams, ladder diagrams and a massively parallel method suitable for implementation in an FPGA or other hardware-based approach.

Figure 6:
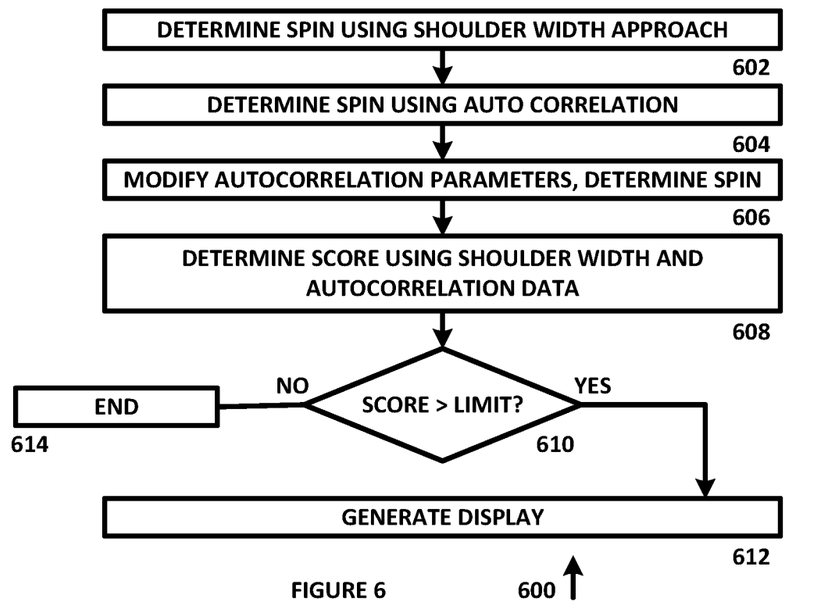
FIG. 6 is a diagram of an algorithm for measuring spin to accurately estimate the spin of a projectile, in accordance with an example embodiment of the present disclosure.

FIG. 6 is a diagram of an algorithm 600 for measuring spin to accurately estimate the spin of a projectile, in accordance with an example embodiment of the present disclosure. Algorithm 600 can be implemented in hardware or a suitable combination of hardware and software.

Algorithm 600 begins at 602, where projectile spin is computed using the shoulder width process as disclosed and described herein, or in other suitable manners. The algorithm then proceeds to 604.

At 604, projectile spin is computed using the autocorrelation process as disclosed and described herein, or in other suitable manners. The algorithm then proceeds to 606.

At 606, autocorrelation variables are modified, such as the location, the strides through the data and other suitable variables of the autocorrelation process. The different locations are used to find the least noisy measurements for autocorrelation. Different strides are used to allow the use of the same autocorrelation function yet different resolutions of results over different length data segments. The modification process can be repeated as many times as needed or as may otherwise be suitable. The algorithm then proceeds to 608.

At 608, a score score[n] is computed for each SpinAC[n] calculation, based on the number and "cleaness" of the harmonics seen in the autocorrelation spectrum. The score can also be increased the closer it is to SpinSW, or other suitable score processes can also or alternatively be used. SpinSW can represent the spin computed using the shoulder width method or other suitable data. The SpinAC[n] values can be checked for similarity to the other autocorrelation measurements, a suitable process be used to select the best SpinAC[n] value, and other suitable processes can also or alternately be used. SpinAC[n] can represent a computed spin based on autocorrelation at multiple times, at different locations and at different strides through the data (different locations to find least noisy measurements, and different strides allows use of same autocorrelation function yet different resolutions of results over different length data segments), or other suitable data. The algorithm then proceeds to 610.

At 610, a score (such as quality of spin measurement estimate) of the selected value of SpinAC[n] is compared to a threshold to determine whether the score (i.e. quality) is good enough, such as by comparing it to a predetermined value. If the score is less than the predetermined value, no spin information is presented to the user, and the algorithm terminates at 614. Otherwise, if it is determined that the score is above the predetermined value, the algorithm proceeds to 612, where the score is presented to the user. The selected winning SpinAC[n] value and all autocorrelations that were found to have a spin close to this spin can be averaged together to get an accurate estimate of the spin, and other suitable processes can also or alternatively be used. The algorithm then returns to 602.

Although algorithm 600 is shown as a flow chart, other suitable conventions for representing or implementing algorithm 600 can also or alternatively be used, including but not limited to object oriented programming, state diagrams, ladder diagrams and a massively parallel method suitable for implementation in an FPGA or other hardware-based approach.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. A software system is typically created as an algorithmic source code by a human programmer, and the source code algorithm is then compiled into a machine language algorithm with the source code algorithm functions, and linked to the specific input/output devices, dynamic link libraries and other specific hardware and software components of a processor, which converts the processor from a general purpose processor into a specific purpose processor. This well-known process for implementing an algorithm using a processor should require no explanation for one of even rudimentary skill in the art. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. A system can receive one or more data inputs, such as data fields, user-entered data, control data in response to a user prompt or other suitable data, and can determine an action to take based on an algorithm, such as to proceed to a next algorithmic step if data is received, to repeat a prompt if data is not received, to perform a mathematical operation on two data fields, to sort or display data fields or to perform other suitable well-known algorithmic functions. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, such as a massively parallel method suitable for implementation in an FPGA or other hardware-based approach, where the data fields and associated functions can be set forth in an exemplary order of operations, where the order can be rearranged as suitable and is not intended to be limiting unless explicitly stated to be limiting.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A method for determining spin of an object comprising:
transmitting a radar signal towards the object from a radar transmitter;
receiving a reflected signal from the object;
identifying a component spectrum of the reflected signal and at least one shoulder frequency of the component spectrum; and
performing a correlation process on the reflected signal using the component spectrum and the shoulder frequency to generate an estimate of a spin of the object as a function of the correlation process and a lag of one or more peaks in the component spectrum.

2. The method of claim 1 further comprising transforming the reflected signal from a time domain to a frequency domain by performing a Fourier transform on the reflected signal.

3. The method of claim 1 wherein identifying the component spectrum of the reflected signal comprises detecting a frequency component of the reflected signal that has a greater magnitude than a magnitude of other frequency components of the reflected signal.

4. The method of claim 1 wherein performing the correlation process on the reflected signal comprises comparing a first spectrum of reflected signal from the object with a second spectrum of the reflected signal from the object to determine a spin rate in revolutions per minute for display.

5. The method of claim 1 wherein performing the correlation process on the reflected signal comprises comparing a first spectrum of reflected signal from the object from a first time with a second spectrum of reflected signal from the object from a second time, wherein the second time is different from the first time, to determine a spin rate in revolutions per minute.

6. The method of claim 1 wherein performing the correlation process on the reflected signal comprises comparing a first spectrum from a reflected signal from the object with a second spectrum from the reflected signal from the object to identify a metric from the first spectrum in the second spectrum.

7. The method of claim 1 wherein performing the correlation process on the reflected signal comprises comparing a first spectrum of frequency data from a reflected signal from the object with a second spectrum of frequency data from the reflected signal from the object to identify a matching pattern.

8. The method of claim 1 further comprising generating an estimate of the spin of the object as a function of shoulder frequencies using calibration data that specifies a known shoulder width associated with a known spin of the object.

9. The method of claim 8 further comprising generating a score as a function of the estimate of the spin of the object as the function of the shoulder frequencies and the estimate of the spin of the object as the function of the correlation process.

10. A system for determining spin of an object comprising:
a radar system transmitting a signal towards the object;
a peak detection system configured to identify a component spectrum of a reflected signal and at least one shoulder frequency; and
a correlation system configured to perform a correlation process on the reflected signal and the shoulder frequency using the component spectrum to generate an estimate of the spin of the object as a function of the correlation process using a summation of a variable number of measurement.

11. The system of claim 10 further comprising a time to frequency domain transform system configured to transform the reflected signal from the time domain to a frequency domain by performing a Fourier transform on the reflected signal.

12. The system of claim 10 wherein the peak detection system is configured to detect a frequency component of the reflected signal that has a greater magnitude than a magnitude of other frequency components of the reflected signal.

13. The system of claim 10 wherein the correlation system is configured to compare a first set of the reflected signals from the object with a second set of the reflected signals from the object.

14. The system of claim 10 wherein the correlation system is configured to compare a first set of reflected signal from the object from a first time with a second set of reflected signal from the object from a second time, wherein the second time is different from the first time.

15. The system of claim 10 wherein the correlation system is configured to compare a first set of peaks from a reflected signal from the object with a second set of peaks from the reflected signal from the object.

16. The system of claim 10 wherein the correlation system is configured to compare a first set of frequency data from a reflected signal from the object with a second set of frequency data from the reflected signal from the object.

17. The system of claim 10 further comprising a shoulder detection system configured to identify shoulder frequencies in the reflected signal.

18. A method for determining spin of an object comprising:
a radar system transmitting a signal towards the object;
receiving a reflected signal from the object;
identifying a first spectrum of the reflected signal, at least one shoulder frequency and a second spectrum of the reflected signal; and
performing a correlation process using the first spectrum of the reflected signal, the shoulder frequency and the second spectrum of the reflected signal to generate an estimate of a spin of the object as a function of the correlation process and a variable number of lag measurements.

19. The method of claim 18 wherein performing a correlation process using the first spectrum of the reflected signal and the second spectrum of the reflected signal comprises comparing a predetermined metric from the first spectrum of the reflected signal with a predetermined metric from the second spectrum of the reflected signal.

20. The method of claim 18 wherein a user interface further displays a first control to exclude the estimate of spin and a second control to select a mode of operation for estimating spin.

* * * * *